US011712956B2

(12) United States Patent
Flaxman

(10) Patent No.: US 11,712,956 B2
(45) Date of Patent: Aug. 1, 2023

(54) DRIVE CONFIGURATION

(71) Applicant: QinetiQ Limited, Hampshire (GB)

(72) Inventor: Robert John Bonner Flaxman, Guildford (GB)

(73) Assignee: QINETIQ LIMITED, Hampshire (GB)

( * ) Notice: Subject to any disclaimer, the term of this patent is extended or adjusted under 35 U.S.C. 154(b) by 0 days.

(21) Appl. No.: 17/390,522

(22) Filed: Jul. 30, 2021

(65) Prior Publication Data
US 2021/0354540 A1    Nov. 18, 2021

Related U.S. Application Data

(63) Continuation of application No. 16/346,729, filed as application No. PCT/EP2017/071948 on Sep. 1, 2017, now Pat. No. 11,110,784.

(30) Foreign Application Priority Data

Nov. 2, 2016 (GB) ..................................... 1618478

(51) Int. Cl.
*B60K 6/445* (2007.10)
*B60K 1/02* (2006.01)
(Continued)

(52) U.S. Cl.
CPC .............. *B60K 1/02* (2013.01); *B60K 17/046* (2013.01); *B60K 17/08* (2013.01); *B60K 6/445* (2013.01);
(Continued)

(58) Field of Classification Search
CPC .......... B60K 1/02; B60K 17/08; B60K 6/365; B60Y 2200/25; B60Y 2400/85; B60L 15/2036; B62D 11/14
See application file for complete search history.

(56) References Cited

U.S. PATENT DOCUMENTS 4,998,591 A * 3/1991 Zaunberger ............ B62D 11/10
180/6.7
5,168,946 A * 12/1992 Dorgan ..................... B60L 7/22
475/5
(Continued)

FOREIGN PATENT DOCUMENTS

CN          1074869 A      8/1993
CN        102358165 A      2/2012
(Continued)

OTHER PUBLICATIONS

International Search Report and Written Opinion for PCT Patent App. No. PCT/EP2017/071948 (dated Nov. 13, 2017).
(Continued)

*Primary Examiner* — Stacey A Fluhart
(74) *Attorney, Agent, or Firm* — Kenealy Vaidya LLP

(57) ABSTRACT

Some embodiments are directed to a drive configuration for a skid-steered vehicle that has a pair of traction motors for rotationally driving opposite outputs of the drive configuration. The traction motors are operatively connected to the outputs via respective gearing arrangements for selectively varying gear reduction between each of the traction motors and the corresponding output. The drive configuration also has a steer differential in a torque connection with the first and second outputs of the drive configuration. The drive configuration additional has a steer motor operatively connected to the steer differential for selectively varying the rotational speed of the first and second outputs in use. Also, the traction and steer motors define a volume in which the gearing arrangements and steering differential are at least partially located.

18 Claims, 2 Drawing Sheets

(51) Int. Cl.
*B60K 17/08* (2006.01)
*B60K 17/04* (2006.01)
B60L 15/20 (2006.01)
B62D 11/14 (2006.01)
F16H 48/36 (2012.01)

(52) U.S. Cl.
CPC ....... *B60L 15/2036* (2013.01); *B60Y 2200/25* (2013.01); *B60Y 2400/85* (2013.01); *B62D 11/14* (2013.01); *F16H 2048/364* (2013.01)

(56) References Cited

U.S. PATENT DOCUMENTS

| | | | |
|---|---|---|---|
| 5,513,719 | A | 5/1996 | Moroto et al. |
| 5,851,162 | A | 12/1998 | Tether |
| 6,358,176 | B1 | 3/2002 | Nauheimer et al. |
| 6,491,599 | B1 * | 12/2002 | Schmidt ............... B60K 6/445 475/8 |
| 2007/0213160 | A1 | 9/2007 | Lyons et al. |
| 2010/0234161 | A1 | 9/2010 | Kato et al. |
| 2014/0182954 | A1 | 7/2014 | Weber |
| 2016/0107686 | A1 | 1/2016 | Haynes |

FOREIGN PATENT DOCUMENTS

| | | |
|---|---|---|
| CN | 103434389 A | 12/2013 |
| CN | 103448539 A | 12/2013 |
| CN | 103507857 A | 1/2014 |
| CN | 103963637 A | 8/2014 |
| CN | 104417634 B | 9/2018 |
| DE | 3728171 A1 | 3/1989 |
| DE | 102011114322 A1 | 3/2013 |
| EP | 0490673 B1 | 5/1995 |
| EP | 1506905 B2 | 5/2010 |
| GB | 2343429 A | 5/2000 |
| WO | 2014206597 A1 | 12/2014 |
| WO | WO2014/206597 A1 | 12/2014 |

OTHER PUBLICATIONS

Search Report for GB Patent App. No. 1618478.0 (dated Jul. 3, 2017).

* cited by examiner

DRIVE CONFIGURATION

CROSS REFERENCE TO RELATED APPLICATIONS

This application claims priority to and is a continuation of U.S. application Ser. No. 16/346,729 filed on May 1, 2019, which is a national phase filing under 35 C.F.R. § 371 of and claims priority to PCT Patent Application No. PCT/EP2017/071948, filed on Sep. 1, 2017, which claims the priority benefit under 35 U.S.C. § 119 of Patent Application No. 1618478.0, filed on Nov. 2, 2016, the contents of each of which are hereby incorporated in their entireties by reference.

GOVERNMENT LICENSE RIGHTS

The presently disclosed subject matter was made with Government support under Contract No. W56HZV-11-C-C001 awarded by the United States Army. The Government has certain rights in the presently disclosed subject matter.

BACKGROUND

Some embodiments relate to drive configurations for skid steered vehicles, including tracked or wheeled vehicles, for example, military vehicles such as armoured tanks.

A skid steered tracked vehicle is steered by forcing opposing parallel tracks to run at different speeds (skid steering). Similarly, a skid steered wheeled vehicle is steered by forcing wheels on one side of the vehicle to run at different speeds to the wheels on the other side of the vehicle. For tracked vehicles to steer, large driving force differences are required between the two tracks—large braking forces on the inner track and high driving forces on the outer track. Differential gears and cross-shafts are used to control the relative speeds of the tracks and transfer the braking power from the inner track to the outer track to sustain the turn. A similar arrangement is used for a skid steered wheeled vehicle.

Electric track drive arrangements based on a "two-line" system use a separate electric motor (propulsion or traction motor) to drive each track. If the regenerative steering power in such a system is handled electrically oversized motors and power converters are needed to handle this power. QinetiQ Limited has developed a range of transmission arrangements (E-X-Drive®), which use the same mechanical regenerative arrangement as in a conventional transmission combined with an electric drive, known as "cross-shaft electric drive" system. In the E-X-Drive® arrangement, the traction motors, multi-speed gear reduction stages and steer differential are arranged in-line along a primary axis, whereas the steer motors are located on a secondary off-set axis running parallel with the primary axis.

It is desirable to adapt the E-X-Drive® transmission offered by QinetiQ Limited based at Cody Technology Park, Farnborough, GU14 0LX in the United Kingdom to reduce its overall weight and package size.

Multiple variations of the E-X Drive® transmission are described in EP1506905B2 (WO02/083483) and WO2014/206597A1. These detail multiple drive configurations for propelling and skid steering tracked vehicles, with opposing tracks exclusively driven by electric motors and skid steering enabled by steering motors and a controlled steer differential, the latter coupling the inner ends of two half motor shafts to control their relative speeds. The differential has a torque connection with the first and second outputs of the drive configuration (e.g. drive sprockets), whilst at least one steer motor is in driveable communication with the differential for selectively varying the rotational speed of the first and second outputs in use so as to control steering. When the steer motor is stationary, the two half shafts are simply coupled by the control differential so that they run at the same speed. When the steer motor is rotated in one direction, one half shaft runs faster than the other and when the steer motor is rotated in the other direction, the other half shaft runs faster than the other. Operation of the steer motor thereby causes the vehicle to turn. (Specifically, one of the pair of planet carriers, or the pair of ring gears, or the pair of sun gears of the respective sides of the differential maybe coupled so as to rotate in common, for example, being integrally formed as a pair or connected by a cross-shaft, whilst the other two pairs are in respective torque connections with the drive mechanism and steer motor(s), respectively, thereby controlling drive output in view of any steer input.)

One particular variation of the E-X-Drive® transmission 1, as illustrated in FIG. 1 herein, includes two traction motors 2, two multi-speed gear reduction stages 4 the torque output of which can be selected by moving the sliders 4a depending on the desired gear reduction, two steer motors 6 and a steer differential 10. The traction motors 2, multi-speed gear reduction stages 4 and steer differential 10 are arranged in-line along a primary axis, whereas the steer motors 6 are located on a secondary off-set axis running parallel with the primary axis, such that the transmission needs to occupy an asymmetric 3D space. Outputs of the transmission 1 are each operatively connected to a dual brake disc assembly 8 and a final drive assembly 12; in particular, the transmission outputs are operatively connected to two (off-set) final drives 12 for the final gear reduction to the track sprockets 13. Persons or ordinary skill in the art having read the above-mentioned documents will be familiar with the style of illustration used in FIG. 1 and so will understand how the illustrated transmission 1 functions in use based on the above description of components and a review of FIG. 1.

It is particularly desirable to reduce the package size of the E-X-Drive® transmission and aspects of the presently disclosed subject matter are conceived to address this.

SUMMARY

According to the presently disclosed subject matter, there is provided a drive configuration including a pair of traction motors for rotationally driving opposite, first and second outputs of the drive configuration, the traction motors being operatively connected to the outputs via respective gearing arrangements for selectively varying gear reduction between each of the traction motors and the corresponding output, a steer differential in a torque connection with the first and second outputs of the drive configuration, and a steer motor operatively connected to the steer differential for selectively varying the rotational speed of the first and second outputs in use, wherein the traction and steer motors define a volume in which the gearing arrangements and steering differential are at least partially located.

Large diameter motors are usually avoided for various reasons, including being heavy and difficult to manufacture. However, the Applicant appreciated that if the traction motors were sized sufficiently large and used alongside a similarly sized steer motor, these could together define a common volume in which the gearing arrangements and steering differential could be at least partially accommodated, thereby allowing a more compact transmission to be designed.

Such a drive configuration is intended for a vehicle, in particular, a skid steered vehicle, and includes a pair of traction drive motors for rotationally driving opposed drive outputs. The traction motors are operatively connected to the (transmission) outputs via respective gearing arrangements for selectively varying gear reduction between each of the traction motors and the corresponding output.

The steer differential is in a torque connection with the first and second outputs of the drive configuration, and at least one steer motor is operatively connected to the steer differential for selectively varying the rotational speed of the first and second outputs in use. Usually, there will be one steer motor, which may preferably be dual wound, but it may be otherwise designed to be fault tolerant.

The traction and steer motors define a volume in which the respective gearing arrangements and steering differential are at least partially located, and may preferably be fully located. The volume may be a single volume, and may preferably be a single cylindrical space, disposed around a central axis (e.g. aligned with the outputs). In particular, a side-by-side arrangement of the traction motors and steer motor (or motors), and their respective rotor cavities, may be used to form a common cavity or space. The motors may be connected or mounted (e.g. on a frame) side-by-side so as to to form a common (integral) structure (e.g. single cylinder).

Preferably, the traction motors and the steer motor, and all or most gearing disposed within the motors, may be aligned co-axially (e.g. with the outputs and/or axes defined by the half (motor) shafts of the differential). Ideally, all or most traction and steer motors, all or most gearing disposed (radially) within the motors, and all or most of the brakes are aligned co-axially within a single cylindrical space. The traction motors may be arranged on either side of the steer motor, which may preferably have the same or similar size (e.g. rotor and/or stator diameter) and may preferably have the same or similar design to the pair of (e.g. identical) traction motors; although the steer motor may have a different axial length (e.g. shorter length).

The (transmission) outputs may be operatively connected to a brake assembly, and optionally, to a final drive assembly (i.e., a final gear reduction), on each side of the transmission. The final drive assembly may include an inline or off-set final drive assembly providing a final gear reduction to respective drive members (e.g. sprockets) for engaging with tracks or wheels of skid steered vehicles. However, the drive configuration need not include a final drive assembly if the traction motors are configured to run sufficiently slowly that a final gear reduction is not required.

In one embodiment, the pair of traction motors and the steer motor are aligned co-axially. The respective gearing arrangements may also be aligned co-axially with the traction and steer motors, as may be the steer differential, and preferably all or most of those may be so aligned. Such an arrangement is in strict contrast to the earlier cross drive transmissions referenced above, where it was believed steer motors could not be accommodated on a common axis.

In one embodiment, each gearing arrangement is at least partially, and may preferably be fully located within the rotor cavity of its respective traction motor.

Likewise, in one embodiment, the steer differential may preferably be at least partially, or fully, located within the rotor cavity of the steer motor.

In one embodiment, the (e.g. single) steer motor is positioned between the pair of traction motors, and within the volume the steer differential is positioned between the respective gearing arrangements.

In one embodiment, the pair of traction motors and the steer motor are similarly sized (e.g. with the same or similar internal rotor and stator diameters).

In one embodiment, the drive configuration may further include a pair of brake assemblies aligned co-axially with the traction and steer motors. The pair of brake assemblies may be so sized as to be of sufficiently small diameter to be located at least partially, and possibly fully, within the volume. In that case, each brake assembly will usually include at least two brake discs.

Alternatively, the pair of brake assemblies may be located axially outside of the motors and the volume defined by the motors. In that case, each brake assembly may include at least one brake disc having a greater diameter than that which could be accommodated within the volume defined by the motors, a single disc being utilized where possible.

There is further provided a vehicle, for example, a tracked or wheeled vehicle, including the above-mentioned drive configuration.

There is further provided a method of manufacturing a vehicle, wherein the above-mentioned drive configuration is incorporated (e.g. retrofitted) into a vehicle of an existing design.

BRIEF DESCRIPTION OF THE FIGURES

Embodiments of the presently disclosed subject matter will now be described by way of non-limiting example with reference to the accompanying drawings, in which.

DETAILED DESCRIPTION OF EXEMPLARY EMBODIMENTS

Figure 1:
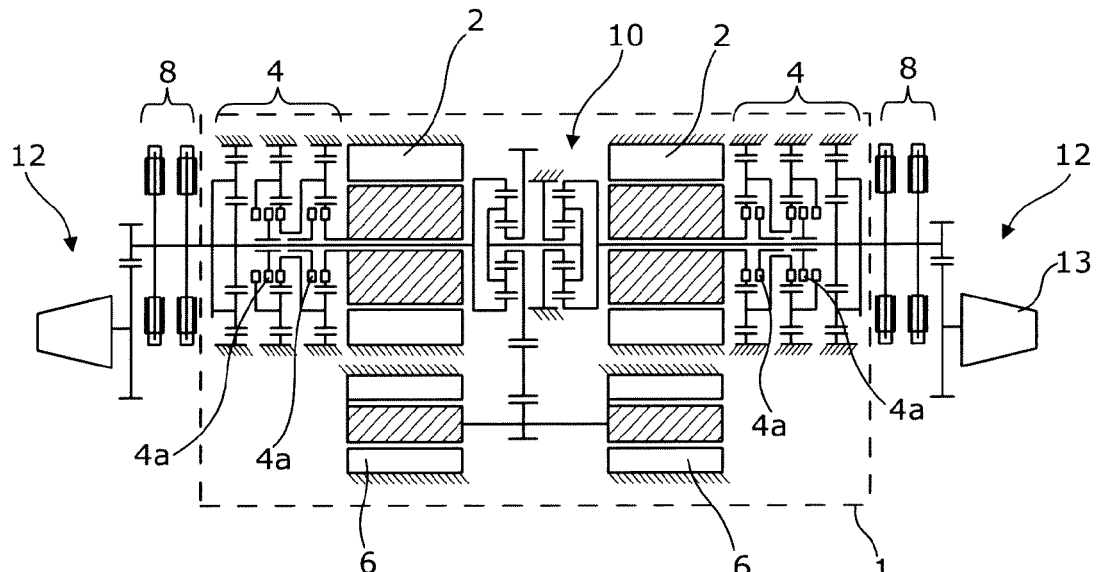
FIG. 1 is a schematic illustration of a previous E-X-Drive® transmission arrangement.

Looking again at FIG. 1, the steer motors 6 are connected in parallel and operate together. The reason for two steer motors 6 is for redundancy. The sum of the required power from the two steer motors 6 is about equal to the required power of one traction motor 2. Therefore, it is possible to create a single steer motor similar in size to a traction motor which would have the same power output and would be geared to give the required speed and torque. If the single steer motor is dual wound (or made fault tolerant) then the same redundancy (as with two steer motors) could be designed in a single steer motor.

Traction motors 2 can be formed so as to be large enough to put gears inside the motor rotor. Moreover if the motor design is changed to a larger diameter with a shorter stack length running at a slower speed, it can become possible to fit the required gear reduction stages inside the rotor of the motor itself.

Advantageously, fitting the gearing inside the motor rotor will provide more axial space. Larger diameter motors would run at a slower speed and would have a shorter axial length (for the same torque and power output) which would further free up axial space.

Figure 2:
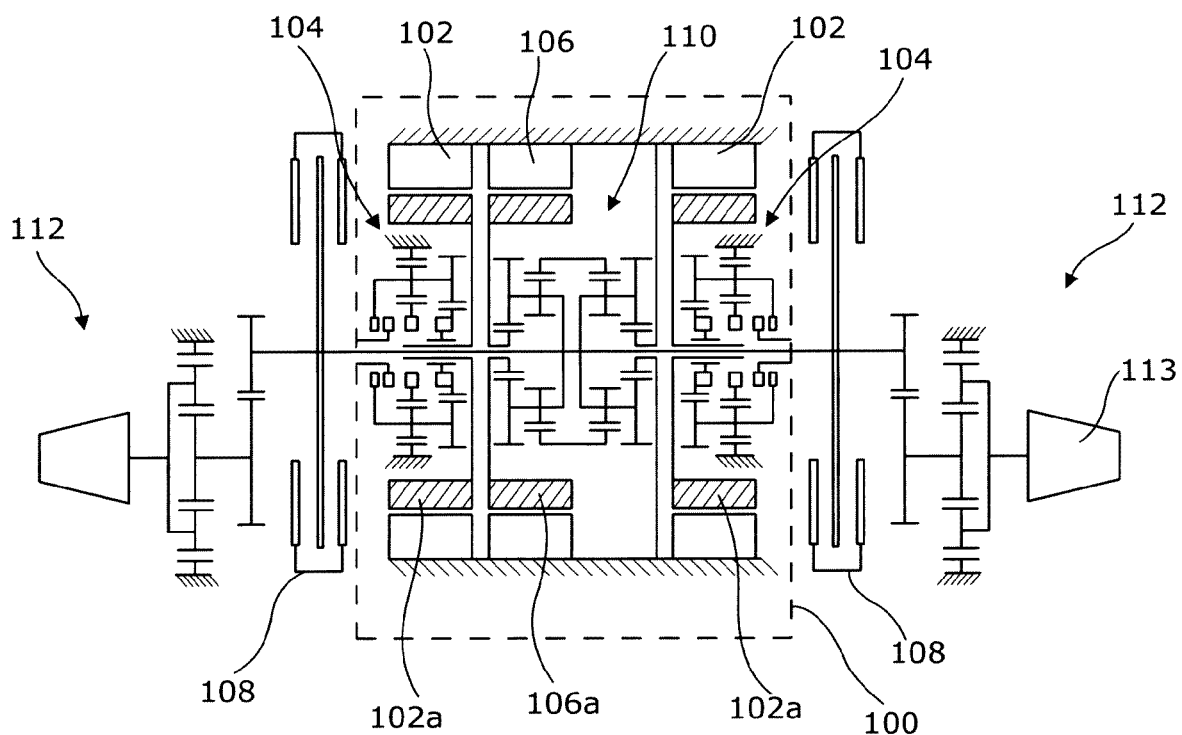
FIG. 2 is a schematic illustration of an E-X-Drive® transmission arrangement according to an aspect of the presently disclosed subject matter having an offset final drive; and, FIG. 3 is a schematic illustration of the E-X-Drive® transmission in FIG. 2 having an inline final drive; and, FIG. 4 is a schematic illustration of a further E-X-Drive® transmission with brake assemblies positioned radially within the volume defined by the motors.

In some embodiments three motors of the same diameter and similar (or same) length (i.e., two traction motors and one dual wound steer motor) can be arranged in a row with gearing and cross-shafts running inside the motor rotors. FIG. 2 illustrates a variation of the E-X-Drive® transmission 100 configured in this manner, wherein like components with FIG. 1 are denoted with similar reference numerals increased by 100. Two traction motors 102, two multi-speed gear reduction stages 104 the torque output of which can be selected by moving the sliders depending on the desired gear reduction output, a steer differential 110 and a steer motor 106 (e.g. a dual wound or fault tolerant steer motor) are arranged in-line along the same axis. The transmission outputs are each operatively connected to a single brake disc assembly 108 (mentioned in more detail later on) and to an off-set final drive 112 for the final gear reduction to the track sprockets 113. As illustrated the gear reduction stages 104 fit at least partially inside the so rotors 102a of the traction motors 102 and the steer differential 110 fits at least partially inside the rotor 106a of the steer motor 106.

Persons of ordinary skill in the art having read the documents acknowledged in the background section will be familiar with the style of illustration used in FIG. 2 and so will be able to understand how the illustrated transmission 100 functions based on the above description of components and a review of FIG. 2.

Referring specifically to the brake discs illustrated in the drawings, the brake design 8 used in the transmission illustrated in FIG. 1 uses two brake discs on each side. During work involving the E-X-Drive® transmission for Ground Combat Vehicle (GCV) offered by QinetiQ Limited the pad/disc rubbing speed was found to be currently about 20% lower than the allowable speed of the pad/disc interface. Also, the temperature of the brake at the pad/disc interface and the bulk temperature of the brake could be allowed to go higher. A new brake design 108 based upon a single larger/thicker disc (on each side) with rubbing speeds closer to the allowable and operating at temperatures closer to the allowable will simplify the brake design. A single thicker disc has a lesser tendency to warp and in some embodiments the pad assembly can be adapted to alleviate the requirement for the disc to slide along shaft (to adjust for wear).

It will be appreciated that whilst various aspects of the presently disclosed subject matter have heretofore been described the scope of the presently disclosed subject matter is not limited to the foregoing disclosure and instead extends to encompass all or most arrangements, and modifications and alterations thereto, which fall within the spirit and scope of the appended claims.

Figure 3:
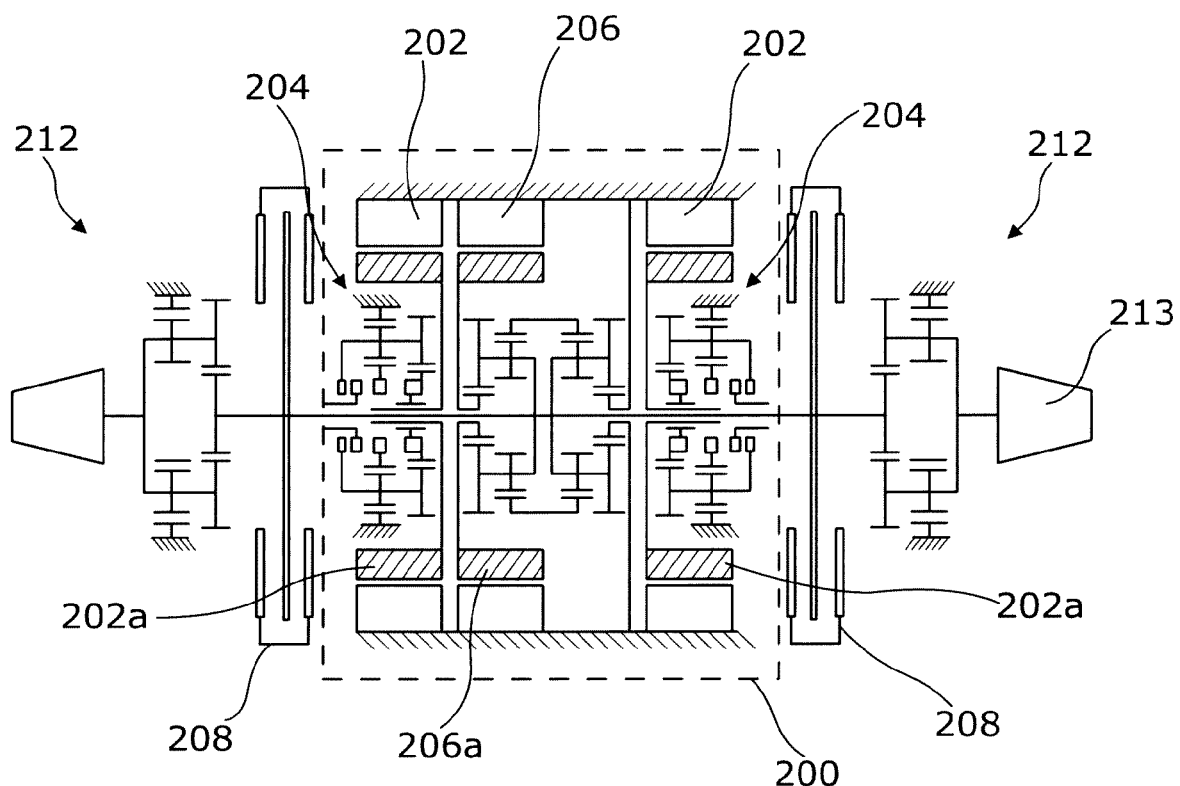

In some embodiments the transmission outputs are each operatively connected to an inline final drive for the final gear reduction to the track sprockets, i.e., on the same axis as the other components. FIG. 3 illustrates such a variation of the E-X-Drive® transmission 200 configured in this manner, wherein like components with FIG. 2 are denoted with similar reference numerals increased by 100 (e.g. inline track sprockets 213).

If the traction motors are configured to run slowly enough (with corresponding increase in output torque) then output stage of the transmission may be omitted. Furthermore, depending upon the top design speed of the traction motors, the final ratio could be used to incorporate a higher gear ratio (than could be obtained with a simple epi-cyclic) by using a compound epi-cyclic gear for an in-line final drive (as shown in FIG. 3) or a simple epi-cyclic plus an off-set spur gear set (as shown in FIG. 2).

Outputs of the transmission 100, 200 may be connected to whatever components are required to enable intended operation of the vehicle in which it is fitted. For example, outputs of the transmission 100, 200 need not necessarily be operatively connected to single disc brake assemblies and could instead be coupled to multi-disc brake assemblies in some embodiments like those in FIG. 1. Furthermore the specific configuration of the final drive arrangement 112, 212 is not an essential component of the presently disclosed subject matter and could be configured according to whatever the intended purpose, if such a final drive assembly is present in a vehicle at all.

Figure 4:
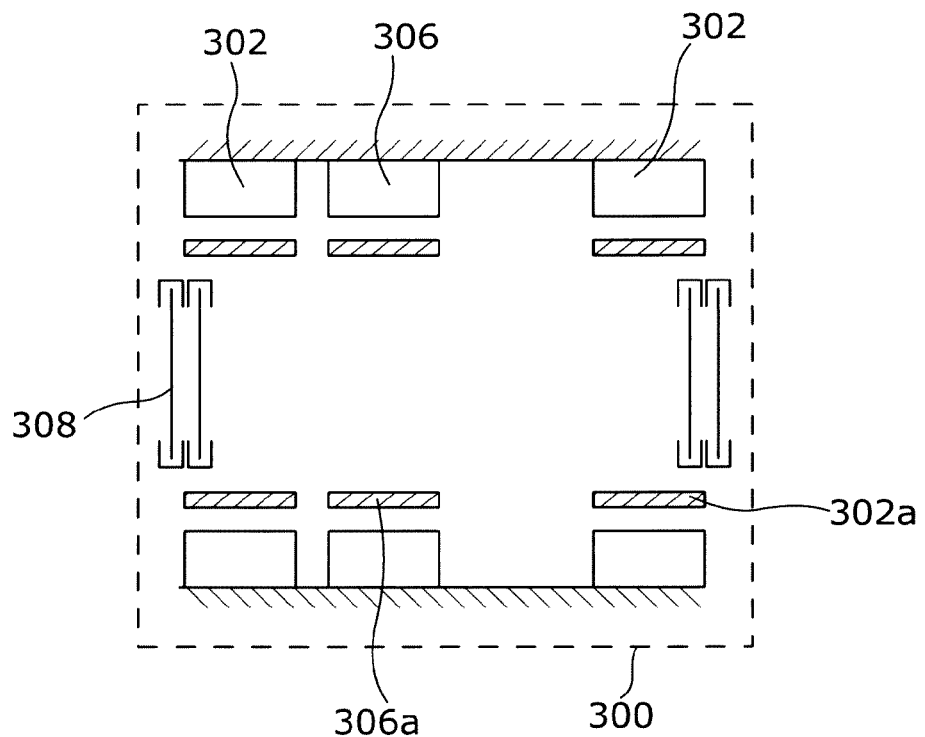

By way of example, FIG. 4 is a schematic illustration of a further E-X-Drive® transmission 300 with brake assemblies 308 shown positioned radially within the volume defined by the motors. The brake assemblies 308 are sized sufficiently small in diameter to fit within the volume and are double brake assemblies. The steer differential, respective gearing arrangements and final drive assemblies are omitted for clarity.

The invention claimed is:

1. A drive configuration, comprising:
 a pair of traction motors for rotationally driving opposite, first and second outputs of the drive configuration, the traction motors being operatively connected to the outputs via respective gearing arrangements for selectively varying gear reduction between each of the traction motors and the corresponding output;
 a steer differential in a torque connection with the first and second outputs of the drive configuration; and
 a steer motor operatively connected to the steer differential for selectively varying rotational speed of the first and second outputs in use,
 wherein the steer motor is positioned between the pair of traction motors, and the pair of traction motors and the steer motor are aligned co-axially to define a volume there-within in which the respective gearing arrangements and steer differential are at least partially located; and
 the drive configuration further including a pair of brake assemblies.

2. The drive configuration according to claim 1, wherein the respective gearing arrangements and/or steer differential are aligned co-axially with the traction and steer motors.

3. The drive configuration according to claim 1, wherein each respective gearing arrangement is at least partially located within a rotor cavity of its respective traction motor.

4. The drive configuration according to claim 1, wherein the steer differential is at least partially located within a rotor cavity of the steer motor.

5. The drive configuration according to claim 1, wherein the steer differential is positioned between the respective gearing arrangements inside the volume.

6. The drive configuration according to claim 1 wherein the pair of traction motors and the steer motor are similarly sized.

7. The drive configuration according to claim 1, wherein the pair of brake assemblies are aligned co-axially with the traction and steer motors.

8. The drive configuration according to claim 7, wherein the pair of brake assemblies are at least partially located outside the volume.

9. The drive configuration according to claim 1, wherein each brake assembly includes at least two brake discs.

10. The drive configuration according to claim 1, wherein the pair of brake assemblies are located axially outside of the volume defined by the motors.

11. The drive configuration according to claim 1, wherein the pair of brake assemblies are aligned co-axially with the traction and steer motors.

12. The drive configuration according to claim 11, wherein the steer motor is positioned adjacent to at least one of the traction motors.

13. The drive configuration according to claim 12, wherein each respective gearing arrangement is at least partially located within a rotor cavity of its respective traction motor; and
wherein the steer differential is at least partially located within a rotor cavity of the steer motor.

14. The drive configuration according to claim 1, wherein the steer motor is positioned adjacent to at least one of the traction motors.

15. The drive configuration according to claim 1, wherein each respective gearing arrangement is at least partially located within a rotor cavity of its respective traction motor; and
wherein the steer differential is at least partially located within a rotor cavity of the steer motor.

16. A vehicle comprising the drive configuration according to claim 1.

17. A method of manufacturing a vehicle comprising:
providing the drive configuration according to claim 1; and
installing the drive configuration into the vehicle.

18. A drive configuration, comprising:
a pair of traction motors for rotationally driving opposite, first and second outputs of the drive configuration, the traction motors being operatively connected to the outputs via respective gearing arrangements for selectively varying gear reduction between each of the traction motors and the corresponding output;
a steer differential in a torque connection with the first and second outputs of the drive configuration; and
a steer motor operatively connected to the steer differential for selectively varying rotational speed of the first and second outputs in use,
wherein the pair of traction motors and the steer motor are aligned co-axially to define a volume there-within in which the respective gearing arrangements and steer differential are at least partially located; and
the drive configuration further including a pair of brake assemblies, wherein each brake assembly includes at least one brake disc having a diameter too large to fit within the volume defined by the motors.

* * * * *